United States Patent
Sakaguchi et al.

(10) Patent No.: US 6,495,246 B1
(45) Date of Patent: Dec. 17, 2002

(54) HEAT-SEALABLE COMPOSITE FILMS

(75) Inventors: Takatoshi Sakaguchi, Amagasaki; Junichi Kimura, Toyonaka; Teruaki Yoshida, Sano, all of (JP)

(73) Assignee: Daicel Chemical Industries, Ltd., Osaka (JP)

( * ) Notice: Subject to any disclaimer, the term of this patent is extended or adjusted under 35 U.S.C. 154(b) by 1382 days.

(21) Appl. No.: 08/726,745

(22) Filed: Oct. 7, 1996

Related U.S. Application Data

(63) Continuation of application No. 08/280,835, filed on Jul. 26, 1994, now abandoned.

(30) Foreign Application Priority Data

Jul. 26, 1993 (JP) ............................................. 5-204614

(51) Int. Cl.[7] .............................. B32B 7/02; B32B 27/32
(52) U.S. Cl. ....................... 428/216; 428/215; 428/327; 428/336; 428/516; 428/519; 428/910
(58) Field of Search ................................. 428/327, 500, 428/515, 519, 521, 516, 523, 215, 216, 910, 336

(56) References Cited

U.S. PATENT DOCUMENTS

| | | | | |
|---|---|---|---|---|
| 4,419,411 A | | 12/1983 | Park ........................... 428/516 |
| 4,911,976 A | * | 3/1990 | Park et al. ................... 428/216 |
| 4,983,447 A | * | 1/1991 | Crass et al. .................. 428/216 |
| 5,151,317 A | * | 9/1992 | Bothe ......................... 428/216 |
| 5,292,563 A | * | 3/1994 | Peiffer et al. ............... 428/35.9 |

FOREIGN PATENT DOCUMENTS

| | | |
|---|---|---|
| EP | 0181065 | 5/1995 |
| JP | 6356864 | 11/1988 |
| JP | 260745 | 3/1990 |
| JP | 371830 | 3/1991 |
| JP | 3205440 | 9/1991 |

* cited by examiner

*Primary Examiner*—D. S. Nakarani
(74) *Attorney, Agent, or Firm*—Pillsbury Winthrop LLP

(57) ABSTRACT

A composite film is provided by providing a poly-propylene or other base resin layer, laminating a first covering layer of a resin composition (1) comprising the following components (A), (B), (C) and (D) to one side of the base resin layer and a second covering layer of a resin composition (2) comprising the components (A) and (D) to the other side of the base resin layer, which composite film is optionally stretched. The resin composition (2) may contain component (C).

(A) a heat-sealable olefinic polymer (e.g. a propylene series copolymer such as propylene-ethylene copolymer, propylene-butene-1 copolymer or propylene-ethylene-butene-1 copolymer)
(B) a diorganopolysiloxane (e.g. dimethylpolysiloxane)
(C) a fine-powdered heat-resistant resin (e.g. microspheres of a thermosetting resin)
(D) a higher fatty acid amide This composite film is excellent in slidability, antistaticity, releasability and clarity and compatible with a high-speed automatic overwrap packaging machine.

14 Claims, No Drawings

HEAT-SEALABLE COMPOSITE FILMS

This is a continuation of application Ser. No. 08/280,835, filed on Jul. 26, 1994, which is now abandoned.

FIELD OF THE INVENTION

This invention relates to a composite film suited for overwrap packaging and a method for producing the film.

BACKGROUND OF THE INVENTION

As packaging materials, a variety of types of film, particularly polypropylene film and polyethylene terephthalate film, both of which are particularly satisfactory in clarity, rigidity and other characteristics, are in use today. Furthermore, a film coated with a vinylidene chloride copolymer which has a heat sealing property as well as a gas barrier property with respect to oxygen and water vapor is in use for the overwrap packaging of various commercial items such as food products, tobacco products, cassette tapes and so on.

Meanwhile, a stretched film such as biaxially oriented polypropylene film is poor in heat sealability. Therefore, development work is in progress on a stretched laminated film comprising a base polymer layer composed of polypropylene or the like and a heat-sealable surface polymer layer of an olefinic polymer. However, the laminate film having an olefinic polymer ply is unsatisfactory in mechanical properties so that it is hardly compatible with an automatic overwrapping machine which is operated at a high speed of, for example, not less than 300 units of packaging load per minute. Thus, if such a laminated film is fed to an automatic overwrapping machine, where it is exposed to both heat and pressure, the slidability and releasability of the film with respect to the machine hardware such as the metal guide plate are markedly decreased. Therefore, overwrap packaging cannot be carried out at a high speed so that the packaging efficiency is remarkably sacrificed.

To improve the slidability of film, it is practiced to add an antiblocking agent, e.g. microfine particles of an inorganic substance such as silica, alumina, synthetic zeolite, etc., those of an organic substance such as polyethylene, or a mineral or petroleum wax to the olefinic polymer [cf. Japanese Patent application No. 71830/1991 (JP-A-3-71830)].

However, even when such an additive is incorporated, the releasability of film with respect to the metal guide plate is unsatisfactory in the sealing stage where the film is subjected to both heat and pressure. Therefore, packaging at a speed over 300 units of packaging load/minute is not feasible.

Also known is a film comprising a polypropylene base layer and an ethylene homopolymer or copolymer covering layer containing a fatty acid amide as a slidability improver or lubricant. However, even with the formation of such a fatty acid amide-containing covering layer, the releasability of film with respect to the metal guide plate in the heat-sealing stage is poor and, therefore, high-speed packaging can not be realized.

To overcome the above disadvantages, Japanese Patent Publication No. 56864/1988 (JP-B-63-56864) proposes a multi-layer film comprising a polypropylene layer and a laminatable layer made of ethylene homopolymer or copolymer, the laminatable layer containing a higher fatty amine, a dispersed thermoplastic resin incompatible with ethylene homopolymer or copolymer and a dialkylpolysiloxane. This film is suited for wrapping cigaret cartons.

Japanese Patent application Laid-open No. 133050/1984 (JP-A-59-133050) discloses an oriented or a stretched multi-layer polypropylene film comprising a polypropylene base layer containing a $C_{8-24}$ monocarboxylic acid amide and a polyolefin surface or skin layer containing a finely divided powder of silica and silicone oil.

Furthermore, Japanese Patent application Laid-open No. 60745/1990 (JP-A-2-60745) discloses a biaxially oriented film comprising a polypropylene-containing base layer and, as laminated to at least one side thereof, a surface layer made from a random copolymer containing ethylene and propylene as constituent units and a diorganopolysiloxane gum. Japanese Patent application Laid-open No. 205440/1991 (JP-A-3-205440) discloses a biaxially oriented film comprising the same base layer as above and, as laminated thereto, a surface layer containing the same copolymer as above, finely divided insoluble silicone rubber and a diorganopolysiloxane gum.

These films are generally well slidable and compatible with high-speed packaging. However, when any of these films is fed to an automatic overwrapping machine for packaging the load at a speed of 300 units of load/minute, the following troubles are encountered. Thus, because of its low-temperature slidability or insufficient antistatic property, the film tends to be electrostatically stuck to a member such as the metal guide plate of the automatic overwrapping machine and cannot be cut to the required size and, hence, cause a jam in the machine, thus preventing high-speed continuous packaging. If an attempt is made to improve the slidability of film by increasing the amount of the incompatible thermoplastic resin or silica powder to the copolymer containing ethylene and propylene as constituent units, the clarity of the film is sacrificed. On the other hand, an organopolysiloxane of high degree of polymerization can hardly be dispersed uniformly in the copolymer so that the film quality as a whole cannot be critically controlled.

SUMMARY OF THE INVENTION

Therefore, it is an object of this invention to provide a composite film with which product s can be packaged at high speed.

It is a further object of this s invention to provide a composite film which is remarkably improved in clarity, slidability, releasability and antistaticity and with which products can be packaged on an automatic overwrapping machine at high speed.

It is still another object of this invention to provide a method for producing a composite film having the above-mentioned desirable characteristics.

The inventors of this invention found after a great deal of research done to accomplish the above objects that when a first covering layer on one side and a second covering layer on the other side of a base resin layer of a laminate film are respectively formed from resin compositions comprising herein-defined components, there is obtained a composite film which is improved markedly in slidability, releasability, clarity and antistaticity and compatible with high-speed packaging.

Thus, the composite film of the present invention comprises a base resin layer, a first covering layer of a resin composition (1) comprising the following components (A), (B), (C) and (D) as laminated to one side of the base resin layer and a second covering layer of a resin composition (2) comprising the following components (A) and (D) as laminated to the other side of the base resin layer.

(A) a heat-sealable olefinic polymer (B) a diorganopolysiloxane
(C) a fine-powdered heat-resistant resin
(D) a higher fatty acid amide The method for producing a composite film according to the present invention comprises laminating a first covering layer of a resin composition (1) comprising the following components (A), (B), (C) and (D) to one side of a base resin layer and a second covering layer of a resin composition (2) comprising the following components (A) and (D) to the other side of the base resin layer.

(A) a heat-sealable olefinic polymer
(B) a diorganopolysiloxane
(C) a fine-powdered heat-resistant resin
(D) a higher fatty acid amide

DETAILED DESCRIPTION OF THE INVENTION

The resin which constitutes the above-mentioned base resin layer includes, for example, polyolefin resins such as polyethylene, polypropylene, ethylene-propylene copolymer, etc.; vinyl alcohol series polymers such as polyvinyl alcohol, ethylene-vinyl alcohol copolymer, etc.; polyvinyl chloride; vinylidene chloride series polymers; styrenic polymers such as polystyrene, styrene-acrylonitrile copolymer, styreneacrylonitrile-butadiene copolymer, etc.; polyesters such as polyethylene terephthalate, polybutylene terephthalate, etc.; nylons or polyamides such as nylon 6, nylon 11, nylon 12, nylon 66, nylon 6/66, nylon 66/610, nylon 6/11, etc.; polyacrylonitrile; and polycarbonates.

The base resin layer is preferably made of polyolefin resin (particularly a polypropylene series resin) or polyester resin (particularly polyethylene terephthalate). The preferred base resin layer is formed from a polypropylene series resin which is generally satisfactory in clarity, rigidity and packaging machine compatibility.

The polypropylene series resin is preferably a crystalline polypropylene series resin. The polypropylene series resin may be a copolymer predominantly composed of propylene, such as copolymers of propylene with α-olefins such as ethylene, butene-1, 3-methyl-pentene-1, 4-methylpentene-1, etc.; although propylene homopolymer is preferred.

The isotactic index (II) of polypropylene series resin should be not less than 92%, preferably not less than 94%, and more preferably not less than 96%. The film produced from a polypropylene series resin having such an isotactic index (II) value does not curl in the course of travel but travels rectilinearly so that it is well adapted to automatic machine packaging.

The intrinsic viscosity [η] of polypropylene series resin is generally about 0.8 to 4 dl/g and preferably about 1 to 2.5 dl/g.

The base resin layer may be a single-layer film or a laminate film composed of two or more resin layers. The thickness of the base resin layer is not restricted but may for example be about 1 to 250 μm and preferably about 5 to 100 μm.

Unless the compatibility of film with a high-speed packaging machine is adversely affected, the base resin layer may contain a variety of additives, for example, various stabilizers such as antioxidants, ultraviolet absorbers, heat stabilizers, etc.; antistatic agents such as cationic antistatic agents (e.g. polyoxyethylenealkylamines, quaternary ammonium salts, hydantoin derivatives, etc.), anionic antistatic agents (e.g. sulfuric acid derivatives, alkyl sulfonates, phosphoric acid derivatives, etc.), nonionic antistatic agents (e.g. fatty acid esters of polyhydric alcohols, such as diols, glycerin, sorbitol, etc., adducts of fatty acid esters to alkylene oxides such as ethylene oxide, etc., polyoxyethylene alkyl phenols, etc.), amphoteric antistatic agents (e.g. alkyl betaines); nucleating agents; hydrocarbon polymers such as styrenic resins, terpene resin, petroleum resin, dicyclopentadiene resin, chroman resins such as chroman-indene resin, phenolic resin, rosin and its derivatives and the corresponding hydrogenated resins; plasticizers; fillers; higher fatty acids and their salts, higher fatty acid esters, waxes such as natural waxes of the mineral or plant origin, and synthetic waxes such as polyethylene; finely divided powdery substances such as powdered silica; etc.

For preventing static adherence of the film to the packaging machine hardware during packaging and further improving its high-speed packaging compatibility, the base resin layer, in particular, preferably contains an antistatic agent. The amount of such antistatic agent may for example be about 0.01 to 5 parts by weight, preferably about 0.1 to 2.5 parts by weight based on 100 parts by weight of the base resin.

For increasing the rigidity or stiffness of film, the base resin layer preferably contains any of the hydrocarbon polymers such as hydrogenated terpene resin, hydrogenated petroleum resin, dicyclopentadiene resin and so on. The amount of the hydrocarbon polymer may for example be generally about 1 to 30 weight % and preferably about 5 to 15 weight %.

The base resin layer may further contain a wax. The amount of the wax is about 0.01 to 5 parts by weight, preferably about 0.1 to 2.5 parts by weight, based on 100 parts by weight of the base resin.

When the first covering layer of resin composition (1) is formed on either side (i.e. both surfaces) of the base resin layer, the tendency of the film towards static charge build-up is increased, possibly due to bleeding of the diorganopolysiloxane (B) out onto the surface of the covering layer so that automatic packaging at high speed will be hindered. Therefore, the other side or surface of the base resin layer is preferably covered with a second covering layer formed from the resin composition (2) which may contain diorganopolysiloxane (B) in an amount less than 0.5 part by weight based on 100 parts by weight of the heat-sealable or -bondable olefinic polymer or particularly the resin composition (2) which does not contain diorganopolysiloxane (B).

The heat-sealable olefinic polymer (A) which can be incorporated in the resin compositions (1) and (2) includes, for example, homopolymers of olefins such as ethylene, propylene, butene-1, 3-methylpentene-1, 4-methylpentene-1, etc. and copolymers containing any of such olefins as a constituent unit.

The preferred olefinic polymer (A) includes heat-sealable polymers, for example, olefinic copolymers such as propylene-ethylene copolymer, propylene-butene-1 copolymer, propylene-ethylene-butene-1 copolymer, ethylene-butene-1 copolymer, ethylene-3-methylpentene-1 copolymer, ethylene-propylene-3-methylpentene-1 copolymer, ethylene-4-methylpentene-1 copolymer, ethylenepropylene-4-methylpentene-1 copolymer, ethylene-butene-1-3-methylpentene-1 copolymer, and so on. The olefinic copolymer may be random copolymers or block copolymers, although random copolymers are more practically employed.

Among particularly preferred species of olefinic polymer (A) are propylene series copolymers such as propylene-ethylene copolymer, propylene-butene-1 copolymer and propylene-ethylene-butene-1 copolymer. Among them, propylene-ethylene-butene-1 copolymer is practically recommendable.

The propylene content of such propylene series copolymers may for example be generally about 68 to 99 weight % and preferably about 70 to 96.5 weight %. The ethylene content of propylene-ethylene-butene-1 copolymer may for example be generally about 0.3 to 8 weight % and preferably about 0.5 to 5.0 weight %, while the butene-1 content of this copolymer is about 1 to 30 weight % and preferably about 3 to 25 weight %.

The olefinic polymer (A) is possessed of heat-sealability, particularly low-temperature sealability, which is required in the heat sealing stage of high-speed overwrap packaging. Thus, the olefinic polymer (A) is useful for forming a sealant layer. However, if both sides of the resin base layer are covered with surface plies composed exclusively of olefinic polymer (A), the slidability of the film against the metal guide plate of a high-speed overwrapping machine, where both heat and pressure are affect on the film, is unsatisfactory.

In contrast, when one side of the base resin layer is covered with a first covering layer of resin composition (1) comprising the heat-sealable (or heat-bond-able) olefinic polymer (A), diorganopolysiloxane (B), fine-powdered (or finely divided) heat-resistant resin (C) and higher fatty acid amide (D) and the other side of the same base resin layer is covered with a second covering layer formed from the resin composition (2) comprising the heat-sealable olefinic polymer (A) and higher fatty acid amide (D) or, preferably, the resin composition (2) which contains the components (A) and (D) and does not contain diorganopolysiloxane (B), there is obtained a composite film having excellent slidability and releasability with respect to the metal guide plate and other hardware in the heat-sealing stage of a high-speed overwrapping machine as well as a high degree of clarity. This composite film is capable of overlap-packaging at least 300 units of packaging load/minute without trouble.

The diorganopolysiloxane (B) mentioned above includes, among others, polysiloxanes having aliphatic hydrocarbon groups such as dimethylpolysiloxane, diethylpolysiloxane, methylethylpolysiloxane, etc.; polysiloxane having aromatic hydrocarbon groups such as diphenylpolysiloxane etc.; and polysiloxanes having both an aliphatic and an aromatic hydrocarbon group, such as methylphenylpolysiloxane. These polysiloxanes can be used alone or in combination. Among the above-mentioned polysiloxanes, dimethylpolysiloxane is practically preferred.

The average molecular weight of diorganopolysiloxane (B) is about $1\times10^4$ to $18\times10^4$. If the average molecular weight is less than $1\times10^4$, no remarkable enhancement of slidability can be expected, and when it exceeds $18\times10^4$, such a diorganopolysiloxane cannot be uniformly compounded with the heat-sealable olefinic polymer (A), for instance. The viscosity of diorganopolysiloxane (B) at 25° C. is generally about $1\times10^4$ to $2 \times 10^6$ centistokes and preferably about $1\times10^5$ to $1\times10^6$ centistokes.

The diorganopolysiloxane (B) may be used in combination with modified silicones such as carboxyl-modified silicone, polyether-modified silicone, etc.

The proportion of diorganopolysiloxane (B) in resin composition (1) is about 0.5 to 3 parts by weight, preferably about 0.7 to 1.2 parts by weight, based on 100 parts by weight of heat-sealable olefinic polymer (A). If the diorganopolysiloxane content is less than 0.5 part by weight, the slidability and releasability of the film will not be adequate, and when it exceeds 3 parts by weight, both clarity and heat sealability tend to be sacrificed.

As mentioned above, the resin composition (2) may contain not more than 0.5 part by weight of diorganopolysiloxane (B) based on 100 parts by weight of heat-sealable olefinic polymer (A) but preferably does not contain the component (B).

The fine-powdered or powdery heat-resistant resin (C) mentioned above functions as an antiblocking agent as well as a lubricant. Powders of inorganic substances such as silica have only low affinities for the polymer and if such inorganic powders are added to the covering layer, the clarity of the film is decreased due probably to gaps between the fine inorganic particles. In contrast, the fine-powdered heat-resistant resin (C) has a high affinity for the polymer and, therefore, no gaps are formed between the particles so that the clarity of the film is not sacrificed and is improved in comparison with a film used a powdery inorganic substance. Moreover, compared with microfine powders of random configuration, spherical particles are conducive to high slidability at a low level of addition and contribute more to film clarity.

It is sufficient that fine-powdered heat-resistant resin (C) be contained at least in the first covering layer but it is preferably incorporated in both the first and second covering layers. When the powdery heat-resistant resin (C) is contained in both the first and the second covering layers, both high clarity and high slidability are insured.

The heat-resistant resin that can be used includes a variety of resins whose thermal deformation temperatures are higher than the film forming temperature, for example, thermosetting resins such as crosslinked acrylic resin, amino resins (e.g. crosslinked melamine-formaldehyde resin, benzoguanamine resin, urea resin and the like), furan resin, epoxy resin, phenolic resin, unsaturated polyester resin, vinyl ester resin, diallyl phthalate resin, polyimide resin, etc., and thermoplastic resins such as polyethersulfone, polyetherimide, polyphenylene sulfide, polyetheretherketone, polyamideimide and so on. The thermosetting resin may have been hardened. These powdery heat-resistant resins may be used alone or in combination.

The powder morphology of the fine-powdered heat-resistant resin (C) is preferably spherical and, for still better results, true round (closed to sphere) in profile. When microspheres are used, the desired degree of slidability develops at a low level of addition without sacrificing the clarity of film. The mean particle diameter of powdery heat-resistant resin (C) may be within the range not adversely affecting the slidability and clarity of film and may for example be about 1 to 6 μm and preferably about 1.5 to 5 μm.

The proportion of powdery or fine-powdered heat-resistant resin (C) is, for example, about 0.1 to 1 part by weight and preferably about 0.2 to 0.7 part by weight based on 100 parts by weight of heat-sealable olefinic polymer (A). If the proportion of heat-resistant resin (C) is less than 0.1 part by weight, slidability will not be appreciably improved, and when the amount of the heat-resistant resin (C) exceeds 1 part by weight, it may happen that clarity is decreased.

As the higher fatty acid amide (D) mentioned above, there may be mentioned saturated higher fatty acid amides such as lauroamide (lauric acid amide), myristamide (myristic acid amide), palmitamide (palmitic acid amide), stearamide (stearic acid amide), behenamide (behenic acid amide), etc.; unsaturated higher fatty acid amides such as oleamide (oleic acid amide), erucamide (erucic acid amide) etc.; and alkylenebisstearamides such as methylenebisstearamide, ethylenebisstearamide, etc., among others. These higher fatty acid amides (D) can be used singly or in combination.

The higher fatty acid amide (D) is preferably a higher fatty acid amide of 16–24 carbon atoms and, for still better results, a monocarboxamide (monocarboxylic acid amide).

The proportion of higher fatty acid amide (D) is generally about 0.01 to 1.0 part by weight and preferably about 0.1 to 0.8 part by weight based on 100 parts by weight of the heat-sealable olefinic polymer (A). If the amount of higher fatty acid amide (D) is less than 0.01 part by weight, the low-temperature slidability with respect to the packaging load is poor so that smooth packaging may not be achieved. On the other hand, if the proportion exceeds 1 part by weight, film clarity tends to be sacrificed. Incidentally, higher fatty acid amide (D) contributes greatly to low-temperature slidability, for example at temperatures up to 100° C.

The first covering layer and/or the second covering layer may contain a variety of additives, for example, stabilizers such as antioxidants, ultraviolet absorbers, heat stabilizers, etc.; antistatic additives; plasticizers; inorganic fillers such as silica, talc, etc.; and waxes, among others.

The thickness of the first covering layer may for example be not greater than about 1 µm, preferably about 0.1 to 0.7 µm and more preferably about 0.3 to 0.7 µm. If the thickness of the first covering layer exceeds 1 µm, tackiness may be increased to sacrifice releasability from the metal guide plate, with the result that high-speed packaging may not be feasible.

The thickness of the second covering layer can be liberally selected within the range not adversely affecting the heat-sealability and other characteristics of the film and may for example be about 0.1 to 5 µm and preferably about 0.5 to 2.5 µm.

The composite film comprising the base resin layer, first covering layer and second covering layer may be an non-oriented film but is preferably an oriented film. The oriented film may be a uniaxially oriented film but is preferably a biaxially oriented film, particularly a biaxially oriented composite film having a biaxially oriented polypropylene series polymer layer(s). If necessary, the oriented film may have been heat-treated.

The surface of the composite film may be subjected to the conventional surface treatment such as corona discharge treatment, flame treatment, plasma treatment or the like. The preferred composite film has a surface-treated second covering layer (particularly, a diorganopolysiloxane (B)-free second covering layer surface-treated) to present a surface tension of not less than about 38 dyne/cm, preferably about 40 to 42 dyne/cm. The composite film of the present invention can be manufactured by a method which comprises laminating a first covering layer of a resin composition (1) comprising the heat-sealable olefinic polymer (A), diorganopolysiloxane (B), the fine-powdered heat-resistant resin (C) and higher fatty acid amide (D) to one side or surface of a base resin layer and a second covering layer of a resin composition (2) comprising the heat-sealable olefinic polymer (A) and higher fatty acid amide (D) to the other side or surface of the same base resin layer. As pointed out above, resin composition (2) preferably does not contain the diorganopolysiloxane (B) but contains the fine-powdered heat-resistant resin (C).

The composite film can be manufactured by the dry laminating technique which comprises laminating the covering layers to the base resin layer with the aid of an anchor coating agent, e.g. a titanium type, polyethyleneimine type or urethane type anchor coating composition, but is preferably manufactured by the coextrusion molding technique.

By the coextrusion molding technique, the composite film can be produced by co-extruding a resin composition for the base resin layer, the first resin composition (1) and the second resin composition (2). Preferably, the extrusion-molded composite film may be subjected to orientation.

For coextrusion molding, a molding machine equipped with a T-die, ring die or the like can be employed. When the base-layer-forming resin composition, the first layer-forming resin composition (1) and the second layer-forming resin composition (2) are independently fed to such a molding machine and melt-extruded concurrently into the die, these three resin compositions converge or meet in the passageway within the die to lie upon one another. As the multi-layer film emerging from the die is cooled, the desired composite film is obtained.

The stretching of the composite film can be performed after the composite film extruded from the die has cooled in the case of the T-die process, while it can be done simultaneously with melt-extrusion from the die in the inflation process.

The technology for stretching or orientation includes, for example, the conventional techniques such as roll stretching, tenter stretching, tube stretching and combinations of these stretchings. The stretching or draft ratio can be appropriately set according to the desired characteristics of composite film. The draft ratio at least in one direction should be generally not less than about 2 and preferably about 5 to 10. The second covering layer of the oriented film may usually be surface-treated to enhance a surface tension.

Despite the formation of a surfacing layer containing a higher fatty acid amide which is generally believed to be incompatible with high-speed packaging, the composite film of this invention is capable of high-speed overwrap packaging. Thus, the composite film is suited to the packaging of various articles, especially for automatic packaging of tobacco cartons and the like at a high speed of 300 units/minute. This specification further discloses an overwrapping method for packaging articles with the above-described composite film at a high speed of not less than 300 units per minute.

Since the surface layers of the composite film of the present invention are formed with compositions comprising defined component materials in defined proportions, the film is able to package articles at high speed. Moreover, this composite film is remarkably high in clarity, slidability, releasability and antistaticity. Therefore, articles can be packaged with this film at high speed using an overwrap packaging machine where both heat and pressure are involved.

In accordance with the method of this invention, the composite film having the very desirable characteristics described above can be easily manufactured.

EXAMPLES

The following examples are intended to describe this invention in further detail and should by no means be construed as defining the scope of the invention.

Example 1

The following compositions (X), ($Y_1$) and ($Z_1$) were provided for the base resin layer, first covering layer and second covering layer, respectively.

Base resin layer composition (X): a mixture of 90 parts by weight of isotactic polypropylene (melt index 2.0 g/10 min., isotactic index 94%), 10 parts by weight of petroleum resin (Arakawa Chemical Industries, Ltd., Japan; trade name Arkon P-125) and 0.5 parts by weight of a mixture of an alkylamine-ethylene oxide adduct and glyceryl monostearate.

First covering layer composition (Y1): a compounded mixture of 100 parts by weight of propyleneethylene-butene-1 random copolymer (ethylene content 3.9% by weight, butene-1 content 4.4% by weight; melt index 9.0 g/10 min.), 1.1 parts by weight of dimethylpolysiloxane (average molecular weight $16 \times 10^4$), 0.4 part by weight of crosslinked acrylic resin microspheres having a mean particle diameter of 4 μm (Soken Chemical & Engineering Co., Ltd., Japan; trade name MR7G) and 0.1 part by weight of stearamide.

Second covering layer composition (Z1): a compounded mixture of the components of the first covering layer composition (Y1) exclusive of dimethylpolysiloxane.

The above compositions (X), (Y1) and (Z1) are respectively fed to an extrusion molding machine equipped with a T-die and coextruded at a temperature of 220 to 230° C. to provide a 3-layered sheet of Y1/X/Z1 structure. This sheet was stretched at a stretching ratio of 6 in the machine direction using rolls at 115 to 125° C. and, then, at a stretching ratio of 10 laterally (i.e. in the transverse direction) at a temperature of 160°C. The film was then heat-treated at 160° C. for 10 seconds, after which the surface of the Z1 layer of the film was subjected to corona discharge treatment to provide a ternary 3-layer composite film. The surface tension of the corona discharge-treated surface was 41 dyne/cm and the thickness of the composite film was 22 μm (the thicknesses of X layer=20 μm, and the thickness of Y1 and Z1 layers =0.5 μm and 1.5 μn, respectively).

Example 2

A ternary 3-layer composite film was manufactured in the same manner as Example 1 except that the following composition (Y2) and composition (Z2) were used in lieu of the compositions (Y1) and (Z1) for the first covering layer and second covering layer, respectively.

First covering layer composition (Y2): a compounded mixture of 100 parts by weight of propyleneethylene copolymer (ethylene content 5.8% by weight, melt index 5.5 g/10 min.), 0.5 part by weight of benzoguanamine-melamine-formaldehyde condensation copolymer microspheres having a mean particle diameter of 2 μm (Nippon Shokubai Co., Ltd., Japan; trade name Epostar MS), 0.7 part by weight of dimethylpolysiloxane (average molecular weight $16 \times 10^4$) and 0.3 part by weight of erucamide.

Second covering layer composition (Z2): a compounded mixture of 100 parts by weight of propyleneethylene copolymer, 0.5 part by weight of benzoguanamine-melamine-formaldehyde condensation copolymer microspheres with a mean diameter of 2 μm and 0.3 part by weight of erucamide.

Example 3

A ternary 3-layer composite film was manufactured in the same manner as Example 1 except that the following compositions (Y3) and (Z3) were used in lieu of the compositions (Y1) and (Z1) for the first covering layer and second covering layer, respectively.

First covering layer composition (Y3): a compounded mixture of 100 parts by weight of propylenebutene-1 copolymer (butene-1 content 23.2% by weight, melt index 5.0 g/10 min.), 0.6 part by weight of crosslinked acrylic resin microspheres having a mean particle diameter of 2 μm (Nippon Shokubai Co., Ltd., Japan; trade name Epostar MA1004), 1.0 part by weight of dimethylpolysiloxane (average molecular weight $10 \times 10^4$) and 0.3 part by weight of erucamide.

Second covering layer composition (Z3): a compounded mixture of the components of the first covering layer composition (Y3) exclusive of dimethylpolysiloxane.

Comparative Example 1

A ternary 3-layer composite film was manufactured in the same manner as Example 1 except that the finely divided crosslinked acrylic resin was omitted from the first covering layer composition (Y1).

Comparative Example 2

A ternary 3-layer composite film was manufactured in the same manner as Example 1 except that stearamide was omitted from the first covering layer composition (Y1).

Comparative Example 3

A ternary 3-layer composite film was manufactured in the same manner as Example 1 except that dimethylpolysiloxane was omitted from the first covering layer composition (Y1).

Comparative Example 4

A ternary 3-layer composite film of Y1/A/Y1 structure was manufactured in the same manner as Example 1 except that the first covering layer composition (Y1) of Example 1 was used in lieu of the second covering layer composition (Z1).

Comparative Example 5

A ternary 3-layer composite film was manufactured in the same manner as Example 1 except that 0.4 part by weight of fine-powdered silica having a mean particle diameter of 4 μm was used in lieu of 0.4 part by weight of fine-powdered crosslinked resin in the first covering layer composition (Y1) and second covering layer composition (Z1).

Comparative Example 6

Both sides of a biaxially oriented film (thickness 20 μm) of isotactic polypropylene (melt index 2.0 g/10 min., isotactic index 94%) were coated with a chlorinated polypropylene-containing anchor coating composition. Then, a coating composition containing 0.3 part by weight of fine-powdered silica lubricant and 0.3 part by weight of antistatic agent per 100 parts by weight of vinylidene chloride copolymer was coated on the anchor coating layer to provide a coated film.

The high-speed overwrap packaging machine compatibility, antistaticity, heat sealability and clarity of the composite films manufactured in the Examples and Comparative Examples were evaluated by the following methods.

High-speed overwrap packaging machine compatibility:

Using an automatic overwrap packaging machine (Tokyo Automatic Machinery Works, Ltd., Japan; W323), cartons each containing 20 cigarettes were packaged with the respective films. Packaging was carried out under conditions of 20° C., 55% RH and 300 cartons/min. for 2 minutes and the packaging compatibility of each film was evaluated according to the following criteria.

(1) Adhesion of film to the metal guide plate
   Good: not adhered
   Poor: adhered (2) Jamming of film in the machine; the number of cartons which can be packaged until the machine has stopped.

(3) Seal quality of packaged cartons
   Good: sealed
   Poor: not sealed

Antistaticity:

Using a static honestmeter (manufactured by Shishido Seidenki Co., Ltd., Japan), the antistaticity of film was evaluated at 20 20 C. and 55% RH. The test film specimen (37 mm×50 mm) being fixed in position, a voltage of 6 kV was applied for 20 seconds to measure the static potential (mV) and, then, the attenuation half-time t (seconds) of the potential after suspension of voltage application was measured. The result was expressed in V/t=mV/second.

Heat Sealability:

Using a gradient heat sealer (Toyo Seiki Co., Ltd., Japan), the corona discharge-treated side and non-treated side of the film were heat-sealed under a pressure of 1 kg/cm² for 1 second. Using a tensile tester (Toyo Baldwin Co., Ltd., Japan; Tensilon), the peeling strength over a width of 15 mm was measured at the pulling speed of 300 mm/min.

Clarity:

In accordance with Japanese Industrial Standards (JIS) K-6714, the haze value of 4 laps of the film was measured with a haze meter (Toyo Seiki Seisakusho Co., Ltd., Japan)

The results are shown in Tables 1 and 2.

TABLE 1

|  | Example 1 | Example 2 | Example 3 | Comp. Example 1 | Comp. Example 2 |
|---|---|---|---|---|---|
| High-speed overwrap packaging machine compatibility |  |  |  |  |  |
| (1) Adhesion of film to the metal guide plate | Good | Good | Good | Poor | Good |
| (2) Number of cartons which can be packaged continuously | No Jamming | No Jamming | No Jamming |  | 50 |
| (3) Seal quality | Good | Good | Good |  | Good |
| Antistaticity (mV/sec.) | 30/40 | 30/30 | 30/30 | 25/30 | 30/50 |
| Clarity (Haze value, 4 laps) | 10.0 | 10.8 | 11.0 | 8.0 | 10.0 |
| Heat-seal strength (g/15 mm) |  |  |  |  |  |
| 120° C. | 300 | 280 | 270 | 290 | 300 |
| 130° C. | 320 | 300 | 300 | 300 | 310 |

TABLE 2

|  | Comp. Example 3 | Comp. Example 4 | Comp. Example 5 | Comp. Example 6 |
|---|---|---|---|---|
| High-speed overwrap packaging machine compatibility |  |  |  |  |
| (1) Adhesion of film to the metal guide plate | Good | Poor | Good | Good |
| (2) Number of cartons which can be packaged continuously | 20 |  | No Jamming | No Jamming |
| (3) Seal quality | Good |  | Good | Good |
| Antistaticity (mV/sec.) | 30/20 | 35/300 | 30/30 | 30/30 |
| Clarity (Haze value, 4 laps) | 8.4 | 18.0 | 17.0 | 17.0 |
| Heat-seal strength (g/15 mm) |  |  |  |  |
| 120° C. | 320 | 200 | 300 | 110 |
| 130° C. | 350 | 350 | 320 | 110 |

It is apparent from Tables 1 and 2 that the composite films obtained in Examples 1-3 are highly compatible with packaging even at a high speed of 300 units/minute, without trouble, and can be smoothly heat-sealed. Moreover, the films were very satisfactory in antistaticity and heat sealability and, compared with the film of Comparative Example 6 which is generally used for overwrap packaging, were superior in clarity and in heat-seal strength.

In contrast, the composite film of Comparative Example 1 was poorly slidable and adhered to the metal guide plate, thus failing to permit continuous automatic packaging. Moreover, the composite films of Comparative Examples 2 and 3 were poor in slidability and high-speed packaging compatibility and the machine stopped when 50 cartons had been packaged in the case of the composite film according to Comparative Example 2 and when 20 cartons had been packaged in the case of the composite film according to Comparative Example 3. Furthermore, the composite film according to Comparative Example 4 were poor in clarity and antistaticity and adhered to the metal guide plate, thus failing to permit continuous automatic packaging.

What is claimed is:

1. A clear composite film comprising a base resin layer, a first covering layer of a first resin composition comprising the following components (A), (B), (C) and (D), which said first covering layer is laminated to one side of said base resin layer and a second covering layer of a second resin composition comprising the following components (A), (C) and (D), and substantially free from the following component (B), which is laminated to the other side of said base resin layer, wherein (A) is a heat-sealable olefinic polymer,
(B) is a diorganopolysiloxane having a viscosity at 25° C. of $1 \times 10^4$ to $2 \times 10^6$ centistokes and is contained in said first resin composition in a proportion of 0.5 to 3 parts by weight relative to 100 parts by weight of said heat-sealable olefinic polymer (A),
(C) is a fine powdered heat-resistant resin which is a hardened or crosslinked thermosetting resin or a thermoplastic resin in the form of microspheres having a mean particle diameter of 1 to 6 $\mu$m and is contained in said first resin composition in a proportion of 0.1 to 1 part by weight relative to 100 parts by weight of said heat sealable olefinic polymer (A), and
(D) is a higher fatty acid which is a $C_{16-24}$ monocarboxylic acid amide and is contained in said first resin composition and second resin composition in a proportion of 0.01 to 1.0 part by weight relative to 100 parts by weight or said heat-sealable olefinic polymer (A).

2. A composite film as claimed in claim 1, wherein said second resin composition further contains said fine-powdered heat-resistant resin (C) in a proportion of 0.1 to 1 part by weight relative to 100 parts by weight of said heat-sealable olefinic polymer (A).

3. A composite film as claimed in claim 1, wherein said base resin layer is formed with a resin composition comprising 0.01 to 5 parts by weight of an antistatic agent and 100 parts by weight of a polypropylene with an isotactic index of not less than 92%.

4. A composite film as claimed in claim 1, wherein said heat-sealable olefinic polymer (A) is at least one propylene series copolymer selected from the group consisting of propylene-ethylene copolymer, propylene-butene-1 copolymer, propylene-ethylene-butene-1 copolymer, ethylene-butene-1 copolymer, ethylene-3-methylpentene-1 copolymer, ethylene-propylene-3-methylpentene-1 copolymer, ethylene-4-methylpentene-1 copolymer, ethylene-propylene-4-methylpentene-1 copolymer and ethylene-butene-1-3-methylpentene-1 copolymer.

5. A composite film as claimed in claim 1, wherein said heat-sealable olefinic polymer (A) is at least one propylene series copolymer selected from the group consisting of propylene-ethylene copolymer, propylene-butene-1 copolymer and propylene-ethylene-butene-1 copolymer.

6. A composite film as claimed in claim 1, wherein said fine-powdered heat-resistant resin (C) is microspheres of a hardened or crosslinked thermosetting resin or a thermoplastic resin each having a thermal deformation temperature of higher than a film forming temperature.

7. A composite film as claimed in claim 1, wherein the thickness of said first covering layer is not greater than 1 $\mu$m.

8. A composite film as claimed in claim 1, wherein said second covering layer has a surface tension of not less than 38 dyne/cm.

9. A composite film as claimed in claim 1, which is a oriented film stretched in at least one direction at a stretching ratio of not less than 2.

10. A clear composite film comprising a base resin layer of a polyproylene having an isotactic index of not less than 94%, a first covering layer of a first resin composition comprising the following components (A), (B), (C) and (D) which is laminated to one surface of said base resin layer, and a second covering layer of a second resin composition comprising the following components (A), (C) and (D), and substantially free of (B), which is laminated to the other surface of said base resin layer, wherein said composite film is a biaxially oriented film, and wherein (A) is a heat-sealable olefinic polymer having a propylene content of 68 to 99% by weight,
(B) is dimethylpolysiloxane having a viscosity at 25° C. of $1 \times 10^4$ to $2 \times 10^6$ centistokes and is contained in said first resin composition in a proportion of 0.5 to 3 parts by weight relative to 100 parts by weight of acid heat sealable olefinic polymer (A),
(C) represents microspheres of a heat resistant resin which is a hardened or crosslinked thermosetting resin or a thermoplastic resin having a mean particle diameter of 1.0 to 5 $\mu$m and is contained in said first resin composition and second resin composition respectively in a proportion of 0.1 to 1 part by weight relative to 100 parts by weight of said heat-sealable olefinic polymer (A), and
(D) is a $C_{16-24}$ monocarboxylic amide which is contained in said first resin composition and second resin composition respectively in a proportion of 0.01 to 1.0 part by weight relative to 100 parts by weight of said heat-sealable olefinic polymer (A).

11. A composite film as claimed in claim 10, wherein said base resin layer is formed with a resin composition comprising 1 to 30 parts by weight of a hydrocarbon series polymer and 100 parts by weight of a polypropylene having an isotactic index of not less than 94%.

12. A composite film as claimed in claim 10, wherein said base resin layer is formed with a resin composition comprising 0.1 to 2.5 parts by weight of an antistatic agent, 5 to 15 parts by weight of a hydrocarbon series polymer and 100 parts by weight of a polypropylene having an isotactic index of not less than 94%.

13. A composite film as claimed in claim 10, wherein said first covering layer has a thickness of 0.1 to 0.7 $\mu$m and said second covering layer has a surface tension of not less than 38 dyne/cm and a thickness of 0.1 to 5 $\mu$m.

14. A clear composite film which comprises a base resin layer, a first covering layer formed of a first resin composition comprising the following components (A), (B), (C) and (D) which is laminated to one side of said base resin layer, and a second covering layer of a second resin composition comprising the following components (A), (C) and (D), and substantially free of (B), which is laminated to the other side of said base resin layer, said second covering layer having a surface tension of not less than 39 dyne/cm, wherein (A) represents a propylene series copolymer having a propylene content of 70 to 96.5% by weight as selected from the group consisting of propylene-ethylene copolymer, propylene-butene-1 copolymer and propylene ethylene butane-1 copolymer, (B) represents dimethylpolysiloxane having a viscosity at 25° C. of $1\times10^4$ to $2\times10^6$ centistokes in a proportion of 0.7 to 1.2 parts by weight based on 100 parts by weight of said propylene series copolymer (A), (C) represents microspheres of a hardened or crosslinked thermosetting resin or a heat-resistant thermoplastic resin having a mean particle diameter of 1 to 6 μm in a proportion of 0.2 to 0.7 part by weight based on 100 parts by weight of said propylene series copolymer (A), and (D) represents a $C_{16-24}$ monocarboxylic amide in a proportion of 0.1 to 0.8 part by weight based on 100 parts by weight of said propylene series copolymer (A).

* * * * *

UNITED STATES PATENT AND TRADEMARK OFFICE
CERTIFICATE OF CORRECTION

PATENT NO.    : 6,495,246 B1
DATED         : December 17, 2002
INVENTOR(S)   : Sakaguchi et al.

It is certified that error appears in the above-identified patent and that said Letters Patent is hereby corrected as shown below:

<u>Title page,</u>
Item [73], Assignee, should read -- Daicel Chemical Industries, Ltd., Osaka (JP) and Sumitomo Chemical Company, Limited, Osaka (JP). --

Signed and Sealed this

Ninth Day of September, 2003

JAMES E. ROGAN
*Director of the United States Patent and Trademark Office*